(12) United States Patent
Weber, Jr. et al.

(10) Patent No.: US 10,327,440 B2
(45) Date of Patent: Jun. 25, 2019

(54) HUNTING DECOY HARNESS WITH WING ACCESSORIES AND METHOD OF USE

(71) Applicants: George L. Weber, Jr., Great Bend, KS (US); Keith C. Burton, Great Bend, KS (US)

(72) Inventors: George L. Weber, Jr., Great Bend, KS (US); Keith C. Burton, Great Bend, KS (US)

( * ) Notice: Subject to any disclaimer, the term of this patent is extended or adjusted under 35 U.S.C. 154(b) by 232 days.

(21) Appl. No.: 15/493,417

(22) Filed: Apr. 21, 2017

(65) Prior Publication Data
US 2017/0303529 A1   Oct. 26, 2017

Related U.S. Application Data

(60) Provisional application No. 62/326,120, filed on Apr. 22, 2016.

(51) Int. Cl.
*A01M 31/06* (2006.01)

(52) U.S. Cl.
CPC .................. *A01M 31/06* (2013.01)

(58) Field of Classification Search
CPC ...................................... A01M 31/06
USPC .......................................... 43/2, 3
See application file for complete search history.

(56) References Cited

U.S. PATENT DOCUMENTS

| 2,413,418 | A | * | 12/1946 | Rulison | A01M 31/06 43/3 |
| 2,769,276 | A | * | 11/1956 | Steiner | A63H 33/006 428/7 |
| 3,290,817 | A | * | 12/1966 | Kravath | A63H 33/006 40/412 |
| 3,747,169 | A | * | 7/1973 | Anderson | A01K 65/00 224/920 |
| 5,551,923 | A | * | 9/1996 | Worzella | A01M 31/06 416/10 |
| 5,595,012 | A | * | 1/1997 | Coleman | A01M 31/06 43/3 |
| 5,960,577 | A | * | 10/1999 | Walterson | A01M 31/06 43/3 |

(Continued)

FOREIGN PATENT DOCUMENTS

| CA | 2809395 |  | 9/2013 |  |
| CA | 2809395 A1 | * | 9/2013 | ............ A01M 31/06 |

(Continued)

*Primary Examiner* — Magdalena Topolski
*Assistant Examiner* — Morgan T Barlow
(74) *Attorney, Agent, or Firm* — Law Office of Mark Brown, LLC; Christopher M. DeBacker (57) ABSTRACT

A harness assembly for a hunting decoy. The harness is made of wire and can fit over all standard hunting decoys. The harness is formed with a central back arch, two side angles which bend generally perpendicular from the arch on either side, which then are bent again several times and terminate into hooks for hooking around the legs of the decoy or about the base of the decoy. The top corners of the harness include receiver slots for receiving a wire wing attachment which is flexible and moves gently when wind or air passes over a cloth clover of the wing attachment. A hook ring attached to the bottom of the wing allows a string to connect the wing to the ground or underneath of the body of the decoy to the other wing to provide a gentle bend to the wings and to prevent them from flying upwards.

13 Claims, 12 Drawing Sheets

(56) References Cited

U.S. PATENT DOCUMENTS

| | | | | |
|---|---|---|---|---|
| 5,983,552 A * | 11/1999 | Nelson | A01M 31/06 | 43/2 |
| 6,092,323 A | 7/2000 | McBride et al. | | |
| 6,408,559 B2 * | 6/2002 | Mathews | A01M 31/06 | 43/3 |
| 6,508,028 B1 * | 1/2003 | Crowe | A01M 31/06 | 43/3 |
| 6,574,903 B2 * | 6/2003 | Solomon | A01M 31/06 | 43/3 |
| 6,698,132 B1 * | 3/2004 | Brint | A01M 31/06 | 43/2 |
| 6,773,768 B2 * | 8/2004 | Weiser | A63H 33/42 | 248/160 |
| 6,857,215 B1 * | 2/2005 | Rickrode | A01M 31/06 | 43/2 |
| 7,137,221 B2 * | 11/2006 | Highby | A01M 31/06 | 43/2 |
| 9,010,013 B2 * | 4/2015 | Smith | A01M 31/06 | 43/2 |
| 2004/0107623 A1 * | 6/2004 | Brint | A01M 31/06 | 43/2 |
| 2004/0248498 A1 * | 12/2004 | Weiser | A01M 31/06 | 446/199 |
| 2005/0160654 A1 * | 7/2005 | Cosciani | A01M 31/06 | 43/2 |
| 2005/0223615 A1 * | 10/2005 | Fencel | A01M 31/06 | 43/3 |
| 2005/0252066 A1 * | 11/2005 | Couvillion, III | A01M 31/06 | 43/3 |
| 2007/0051030 A1 * | 3/2007 | Haley | A01M 31/06 | 43/3 |
| 2009/0165353 A1 * | 7/2009 | Priest | A01M 31/06 | 43/3 |
| 2009/0229163 A1 * | 9/2009 | Latschaw | A01M 31/06 | 43/2 |
| 2009/0249678 A1 * | 10/2009 | Arnold | A01M 31/06 | 43/2 |
| 2010/0115818 A1 * | 5/2010 | Rogers | A01M 31/06 | 43/2 |
| 2011/0023349 A1 * | 2/2011 | Hughes | A01M 31/06 | 43/3 |
| 2011/0088307 A1 * | 4/2011 | Rice | A01M 31/06 | 43/3 |
| 2011/0203154 A1 * | 8/2011 | Price | A01M 31/06 | 43/3 |
| 2012/0227306 A1 * | 9/2012 | Fong | A01M 31/06 | 43/3 |
| 2014/0237885 A1 * | 8/2014 | Brooks | A01M 31/06 | 43/2 |
| 2014/0332645 A1 * | 11/2014 | Brooks | A01M 31/06 | 248/156 |
| 2015/0313207 A1 * | 11/2015 | Anson | F16M 11/00 | 43/3 |
| 2016/0021871 A1 * | 1/2016 | Holste | G01P 13/02 | 73/170.05 |
| 2016/0212985 A1 * | 7/2016 | Bullington | A01M 31/06 | |
| 2016/0309704 A1 * | 10/2016 | Young | A01M 31/06 | |
| 2017/0176125 A1 * | 6/2017 | Pauley | A01M 31/06 | |
| 2017/0181423 A1 * | 6/2017 | Xu | A01M 31/06 | |

FOREIGN PATENT DOCUMENTS

| | | | | |
|---|---|---|---|---|
| GB | 406386 | | 3/1934 | |
| GB | 406386 A | * | 3/1934 | A01M 31/06 |

* cited by examiner

HUNTING DECOY HARNESS WITH WING ACCESSORIES AND METHOD OF USE

CROSS-REFERENCE TO RELATED APPLICATION

This application claims priority in U.S. Provisional Patent Application No. 62/326,120 Filed Apr. 22, 2016, which is incorporated herein by reference.

BACKGROUND OF THE INVENTION

1. Field of the Invention

The present invention relates generally to a hunting decoy harness and method for use thereof, and more specifically to a hunting decoy wire-framed harness with wing accessories for use with existing hunting decoys.

2. Description of the Related Art

Existing hunting decoys for geese and other birds have been rather standardized over the past twenty-plus years. These include models for all varieties of fowl and bird. Some standard decoys include the Bigfoot and B2 models of goose decoys sold by Cabela's Inc. of Sidney, Nebr. Others include: the Fully Body Decoys manufactured by Dakota Decoy Company of Vermillion, S. Dak.; various decoys by Flambeau, Inc. of Middlefield, Ohio; and other similar solid-bodied decoys.

These decoys are generally stationary and require being placed on the ground. It is common for hunters to own dozens of these decoys and to deploy them around an area. However, geese and other birds soon learn what to look for with these stationary, standard decoys and learn to avoid their placement. What is needed is a modification for these existing decoys which allows the decoys to appear more life-like to geese and other birds such that they are more effective for attracting these birds.

Heretofore there has not been available a system or method for a decoy harness with the advantages and features of the present invention.

BRIEF SUMMARY OF THE INVENTION

The present invention generally provides a harness assembly for a hunting decoy, such as a goose or crane decoy. The harness is made of wire for flexibility such that it can fit over most/all standard hunting decoys. The harness is made from a single piece of wire bent and formed with a central back arch, two side angles which bend generally perpendicular from the arch on either side, which then are bent again several times and terminate into leg hooks for hooking around the legs of the decoy, thereby securing the harness in place. Optionally, if the decoy has no legs, the lower portions of the harness can interlock beneath the decoy's body.

The top corners of the harness include receiver slots for receiving a wire wing attachment which is flexible and moves gently when wind or air passes over a cloth clover of the wing attachment. The wire wing attachments include frames formed to appear structurally similar to the wings of a goose or other bird. The covers are made of a soft, durable material such as Tyvek® cloth. A preferred embodiment would have the cloth crinkled and crumpled to create a softer exterior to the cloth. This exterior may be painted or otherwise colored to more accurately resemble a bird wing. A hook ring attached to the bottom of the wing allows a string to connect the wing to the ground or underneath of the body of the decoy to the other wing to provide a gentle bend to the wings and to prevent them from flying upwards.

No motor or other device is used to make the wings and feet move—all movement is due to wind and the flexibility of the invention.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Hunting Decoy Harness System 2

Figure 1:
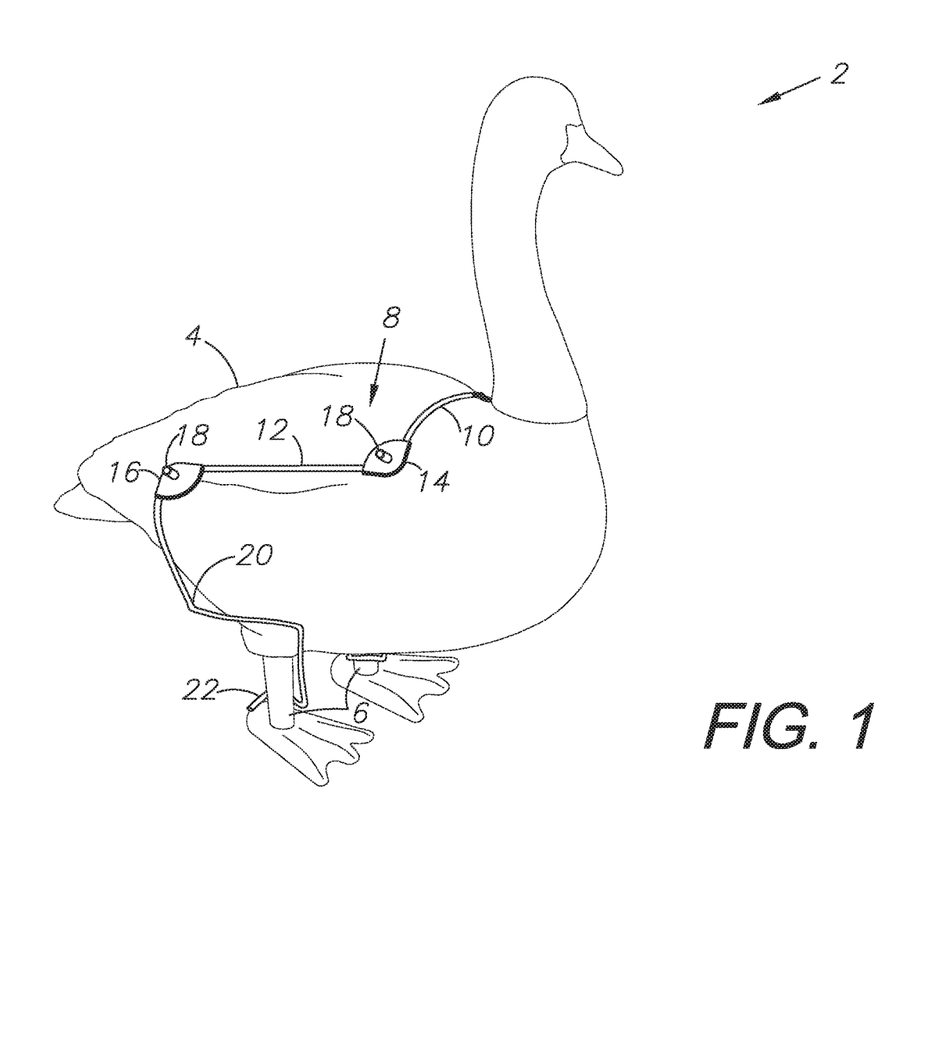
FIG. 1 is a three-dimensional isometric view of a preferred embodiment of the present invention at a first step.
Figure 2:
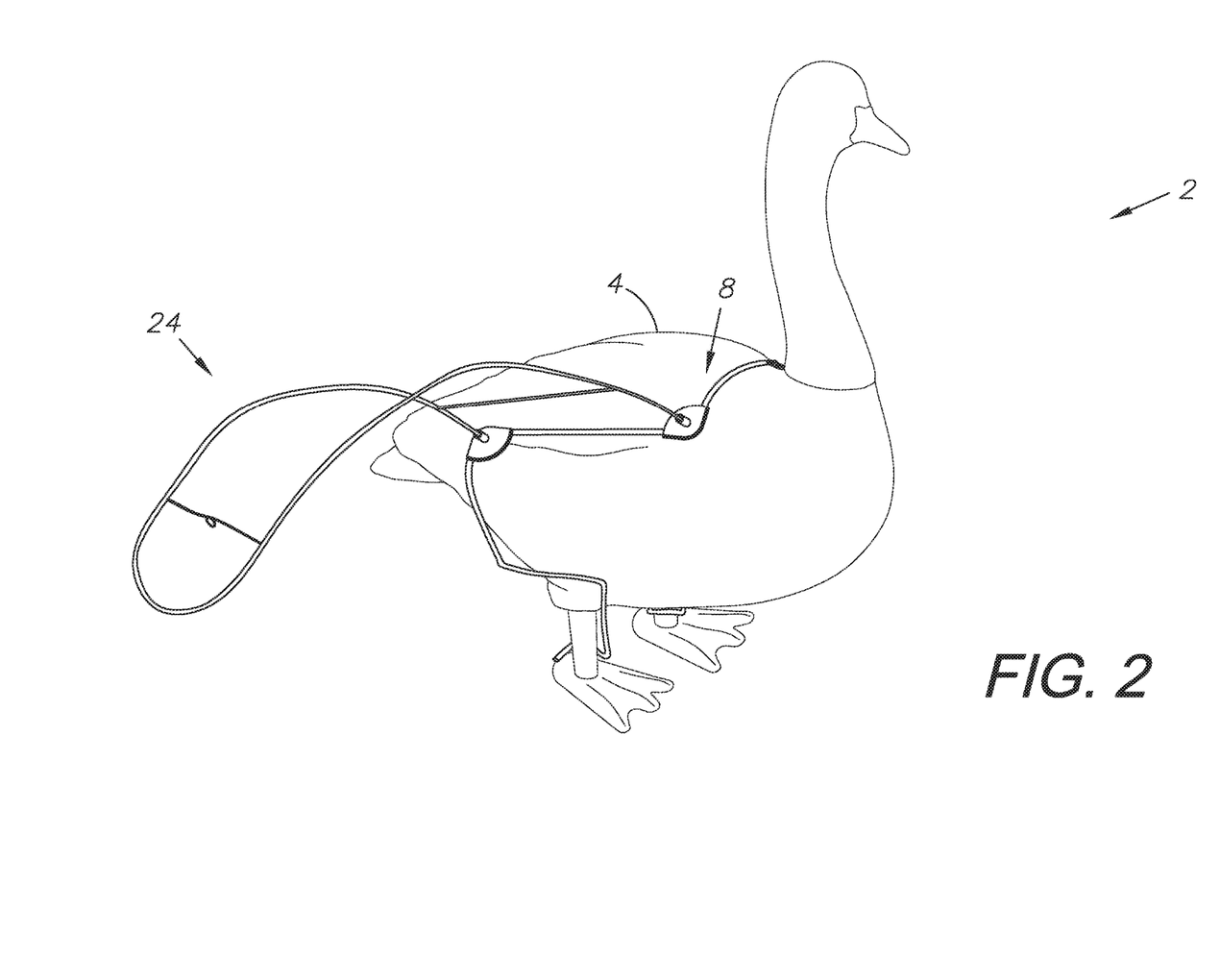
FIG. 2 is a three-dimensional isometric view of a preferred embodiment of the present invention at a second step.

FIG. 1 shows a hunting decoy harness system 2, including a wire-framed harness 8. The rest of the system, as further detailed in FIGS. 2-9 show additional elements, including wing wire frames 24 covered in cloth wing covers 44. Receivers 18 for receiving the wing wire frames 24 onto the wire-framed harness are welded onto front 14 and rear 16 plates onto the harness 8. They receive wing wire frame 24 ends 38. This entire system is installed on a standard decoy 4 provided by a third party of any size. The harness is designed to fit most or all solid bodied decoys.

Figure 3:
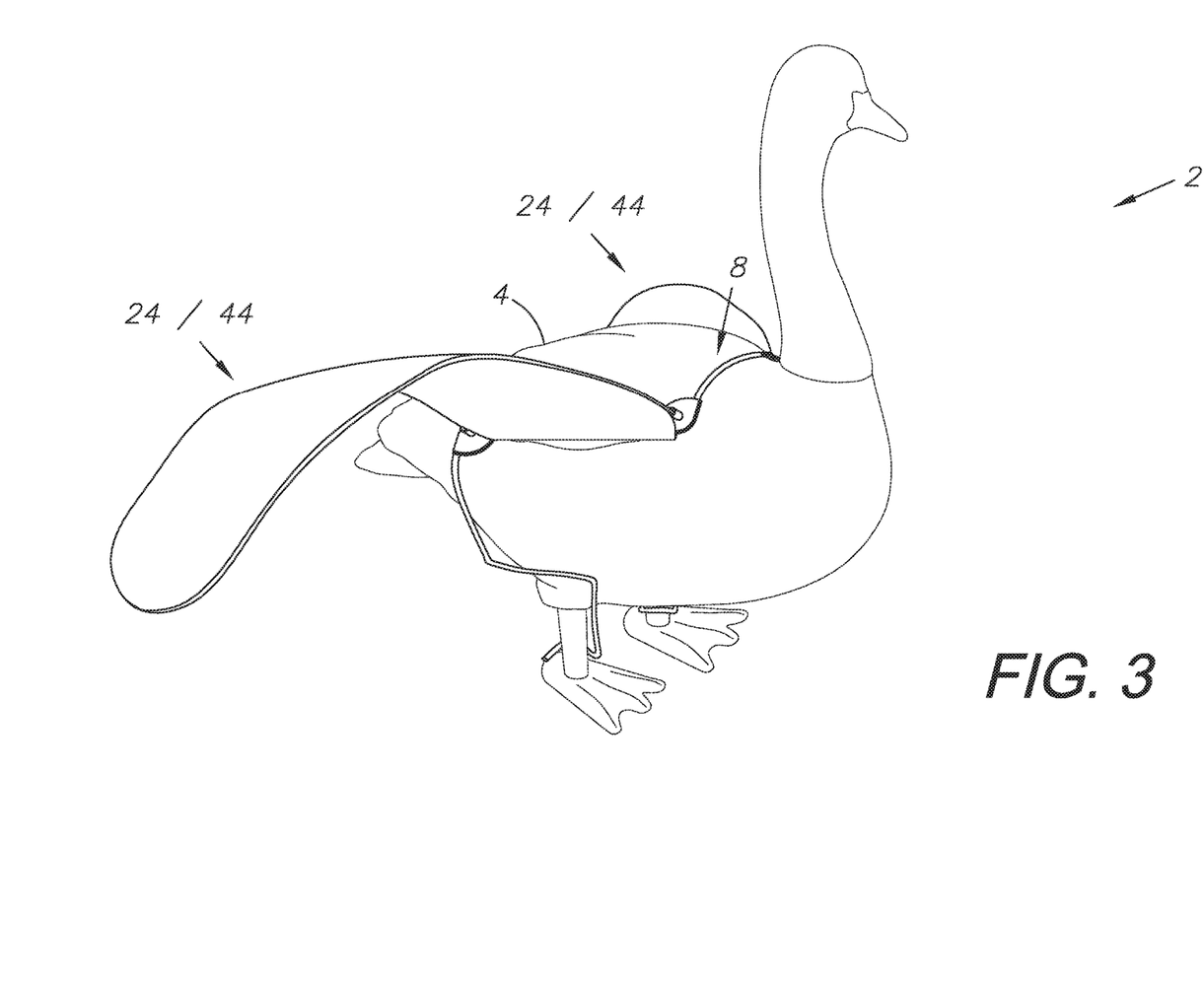
FIG. 3 is a three-dimensional isometric view of a harness element of the present invention thereof.

The harness frame is made of semi-flexible wire such that it fits snugly over the body of the decoy. FIG. 3 shows the harness 8 alone. The harness 8 generally includes a wire frame which has a curved arch 10 designed to sit on the back of the decoy body, and two side wires 12 which connect front 14 and rear 16 welded plates. The side wires 12 are bent into a lower portion 20 which terminates into a hooked end 22 for wrapping behind the legs 6 of the decoy 4. The curved arch 10 may include a tab 28 for receiving a screw or other connector for securing the harness 8 to the back of the decoy 4. A secondary structural wire 26 may also be included between the receivers 18 on either side of the harness 8 and may further be used to secure the wing sleeve 44 as discussed below. The sleeve could be painted to resemble a bird's wings or could be screen printed with an actual photo of a bird's wings for a more realistic effect.

Figure 4:
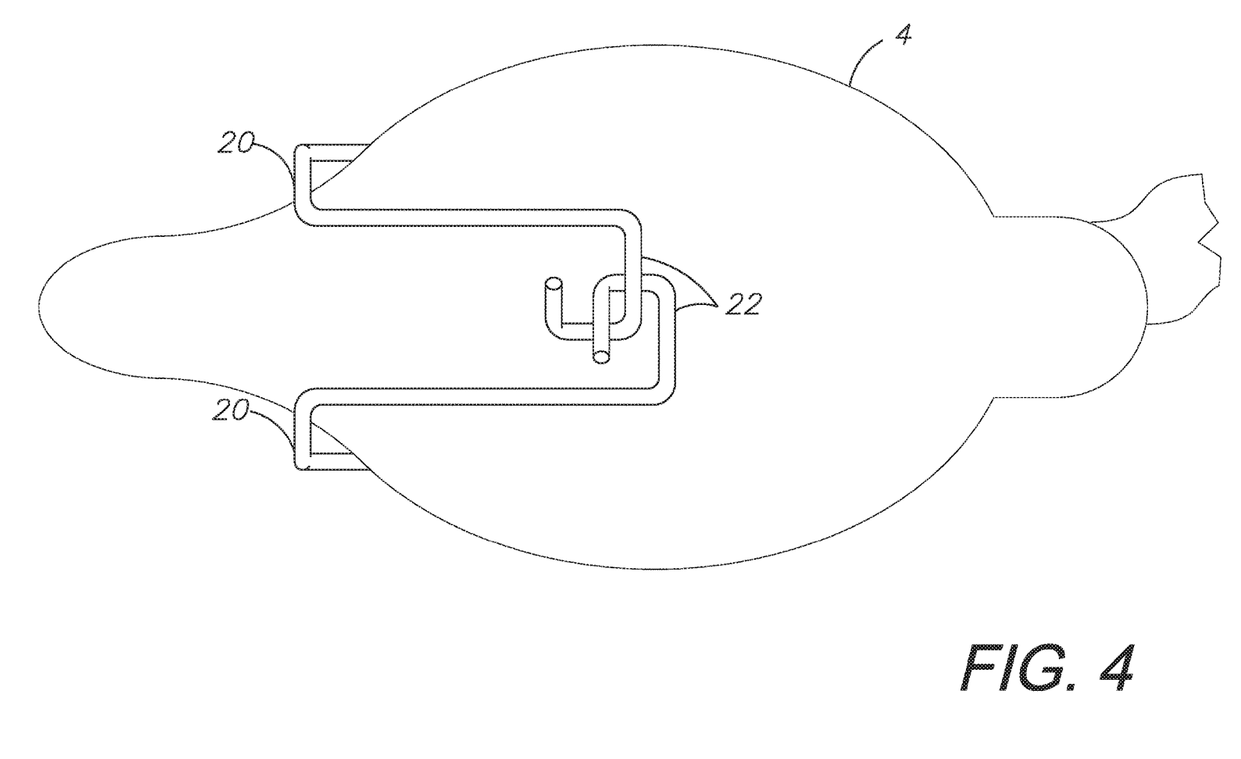
FIG. 4 is a bottom plan view of an embodiment of the present invention in a typical environment of a decoy body having no leg elements.

Alternatively, as shown in FIG. 4, the lower portions 20 of the harness 8 can be further bent such that the hooked ends 22 interlock with one another, thereby securing the harness about the body of a decoy with or without leg 6 elements.

Figure 5:
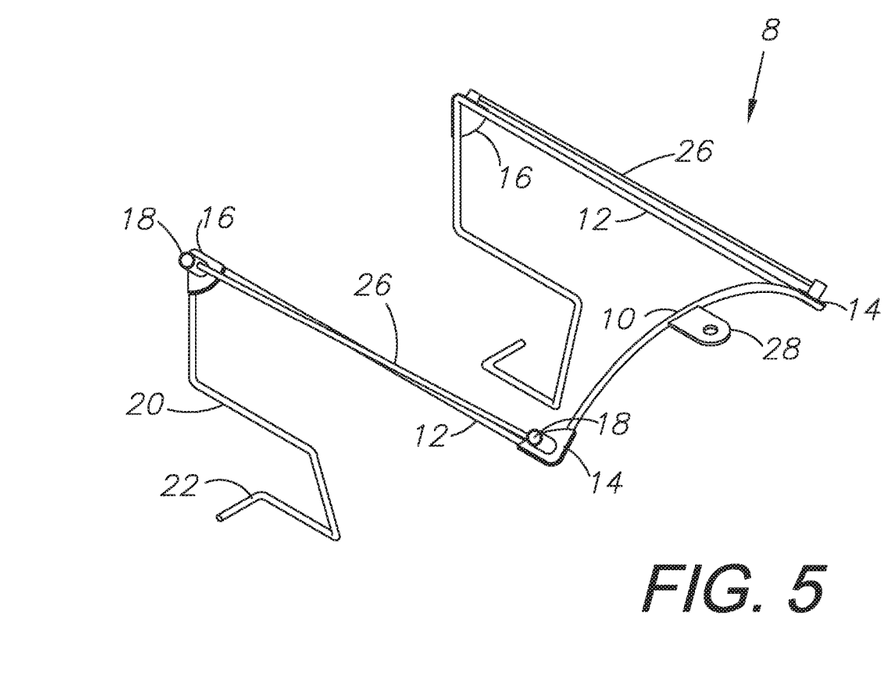
FIG. 5 is a three-dimensional isometric view of a wing frame element thereof.
Figure 6:
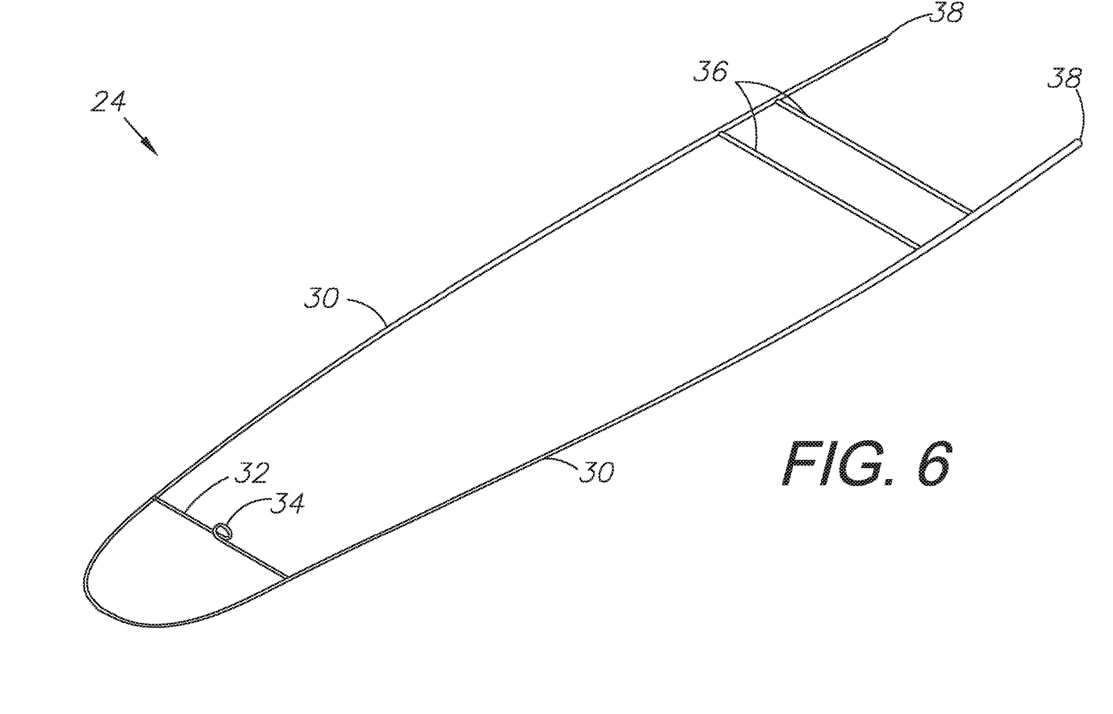
FIG. 6 is a top plan view thereof.
Figure 7:
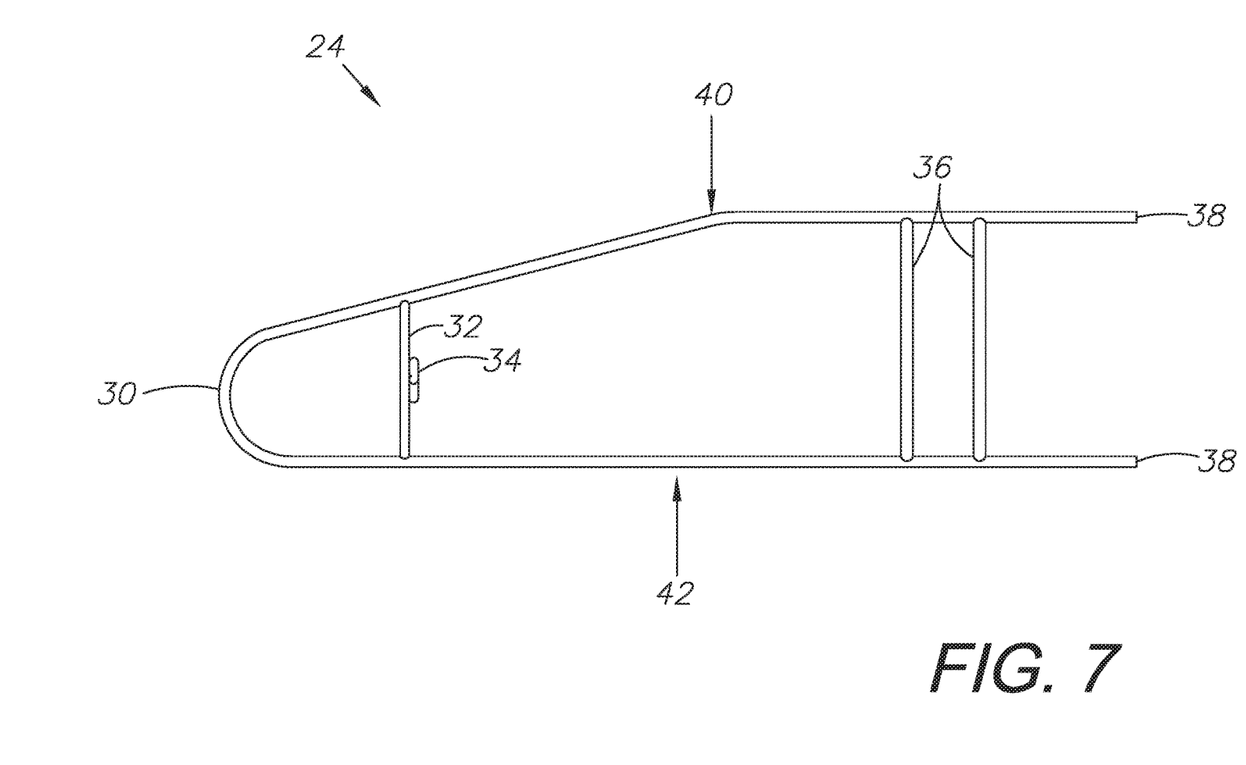
FIG. 7 is a top plan view diagramming the combination of multiple elements of the present invention.

FIGS. 5 and 6 show a wire wing 24 element. The wing has a wire frame 30 which terminates into two end inserts 38 which are received by the receivers 18 on the harness 8. Structural cross wires 36 help to keep the shape of the wire wing 24. A frontal structural wire 32 may include a loop 34 or other tie-down receiver for receiving a string or other tie-down element for securing the wing to the ground, the decoy, or another surface. This prevents the wings from lifting the harness off of the body due to wind.

Figure 8:
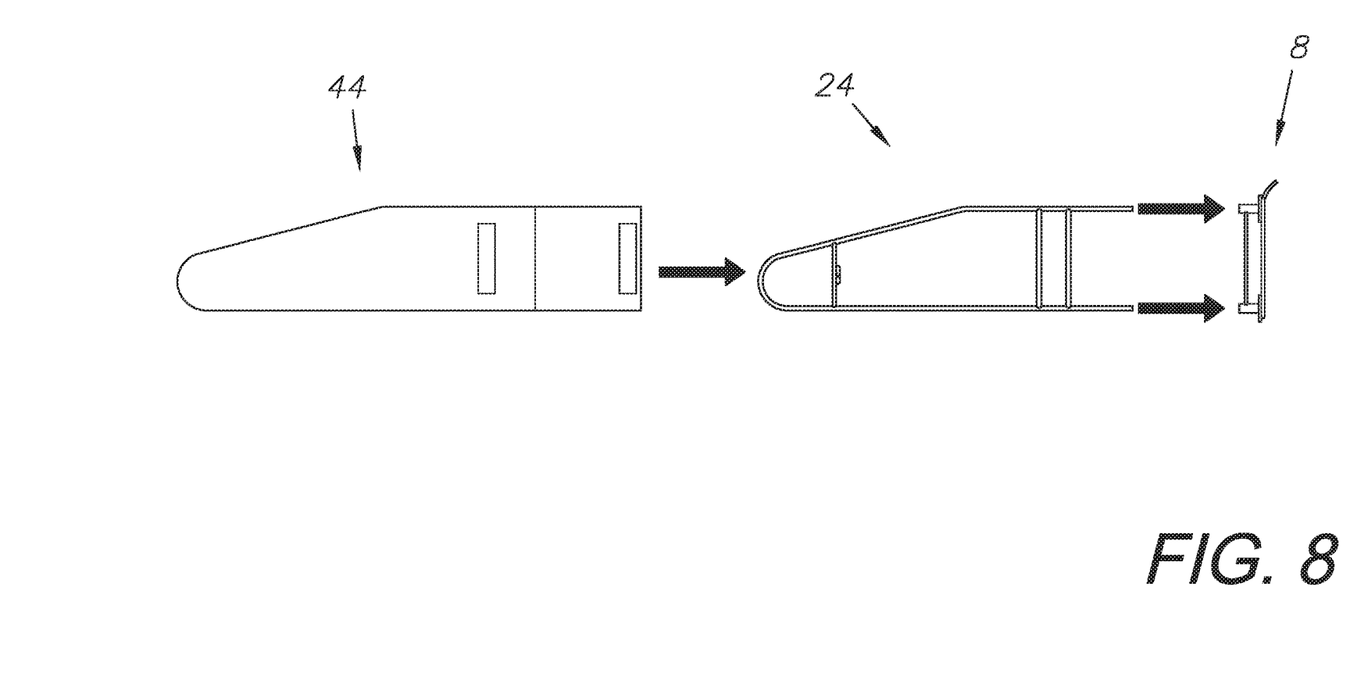
FIG. 8 is a top plan view continuing the process from FIG. 6.
Figure 9:
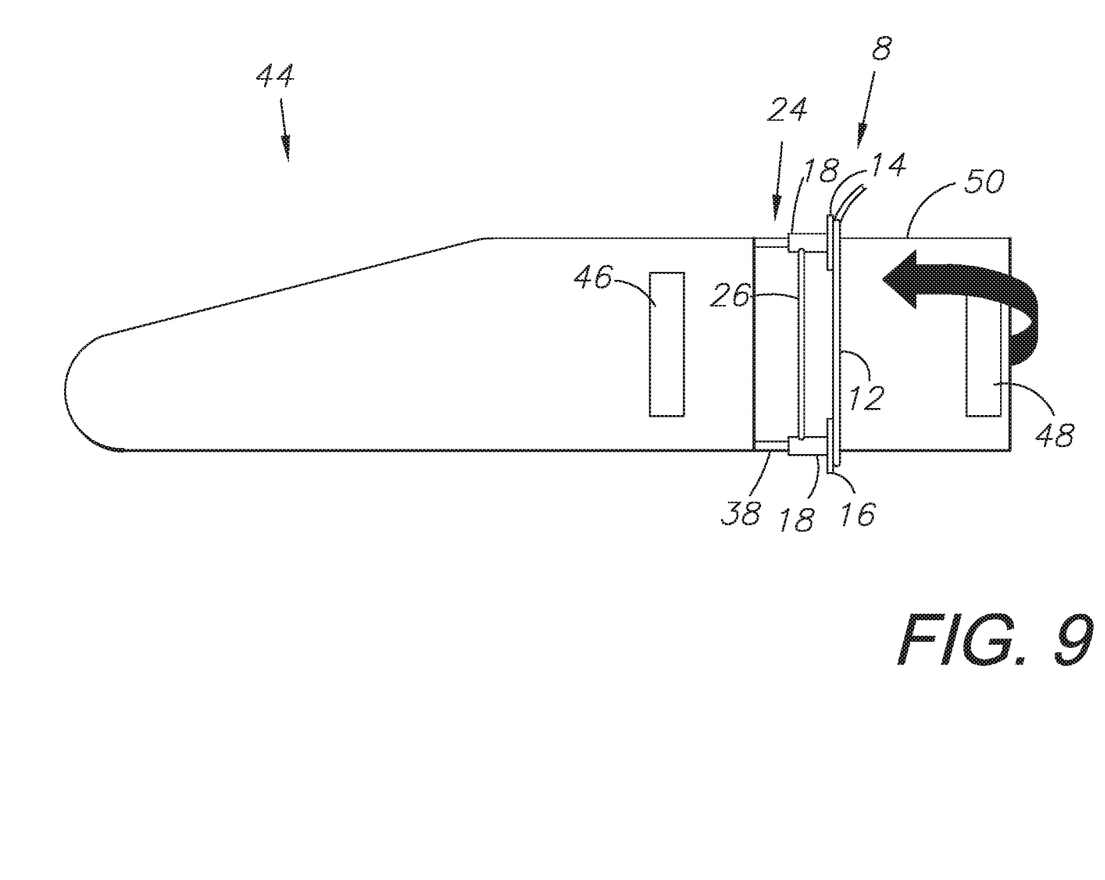
FIG. 9 is a top plan view continuing the process from FIG. 7.
Figure 10:
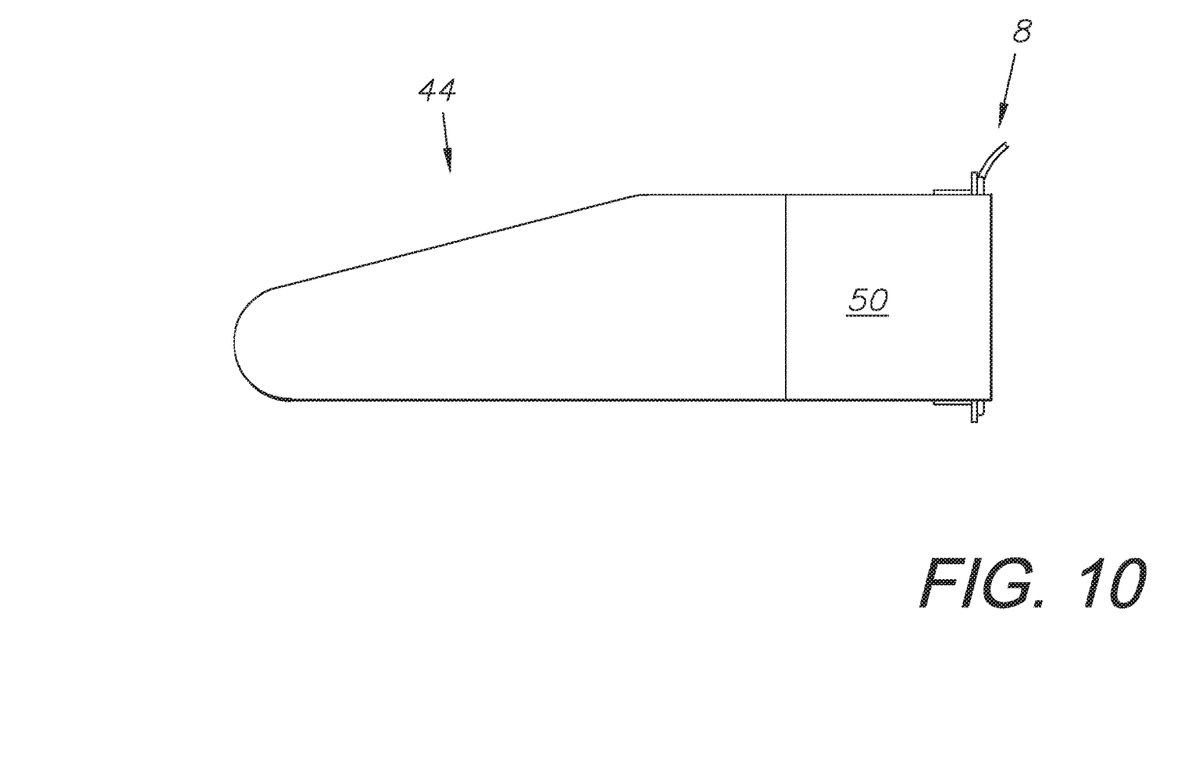
FIG. 10 is a three-dimensional isometric view of a preferred embodiment of the present invention.

The wire wing includes a front edge 40 and a rear edge 42. A wing sleeve 44 fits over the wire wing 24 and helps to secure the wing to the harness 8 as shown in FIGS. 7-10. As shown in FIGS. 8 and 9, a flap 50 can be wrapped about side wires 12 and/or secondary structural wire 26 of the harness. A hook-and-loop fastener can secure the flap 50 to the main body of the sleeve 44, with a first portion hook-and-loop fastener 46 on the sleeve 44 and a second portion hook-and-loop fastener 48 on the flap 50. The wing sleeves are made of a soft material intended not to make much noise when rustled by the wind. Suitable material includes crumpled Tyvek® cloth or suitable material which provides high durability in the wind and other elements. The material may be painted or otherwise colored. The wings are designed to resemble natural wings and when the decoy is placed in a field, the wings catch the wind and raise and lower in a natural manner.

Figure 11A:
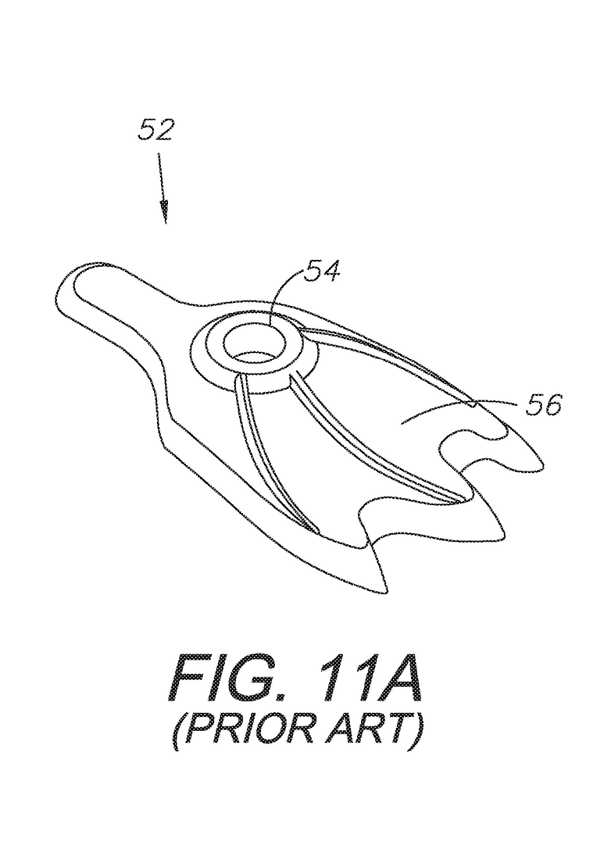
FIG. 11A is a prior art foot element.

FIG. 11A shows a prior art solid foot 52 which is connected to the leg 6 of a decoy 4. The foot 52 has an inset 54 which connects to the leg 6 and a base 56 which resembles the foot of a bird and which helps to balance the decoy. When raised in the air, these prior art feet 52 remain fixed, rigid, and unnatural.

Figure 11B:
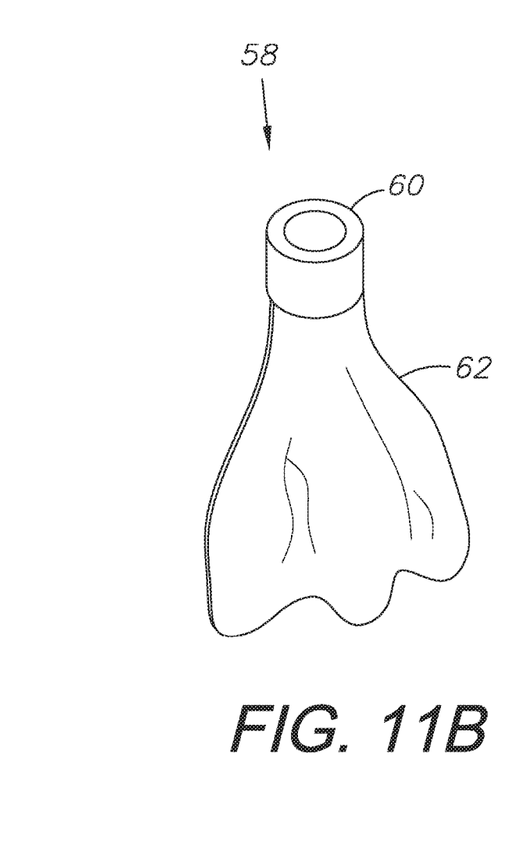
FIG. 11B is an alternative foot element which can be used in conjunction with a preferred embodiment of the present invention.

FIG. 11B shows a new foot 58 which connects to the leg 6 of the decoy 4. The connector 60 may be similar to that of the prior art, or may simply tie or otherwise engage the base of the leg 6 of the decoy 4. The foot portion 62 is made of the same material as the wing sleeve 44. When raised in the air such as via a pole and round washer as shown in FIG. 11, these feet will move gently in the breeze, simulating real life movement. The wings cause the decoy to turn into the wind about the round washer, simulating an actual bird landing or taking off from a field. This provides a real, life-like appearance to an otherwise stationary static decoy which provides superior performance of the decoy not provided by the base model III. Alternative Embodiment Raised Decoy with Hunting Decoy Harness System 102

Figure 12:
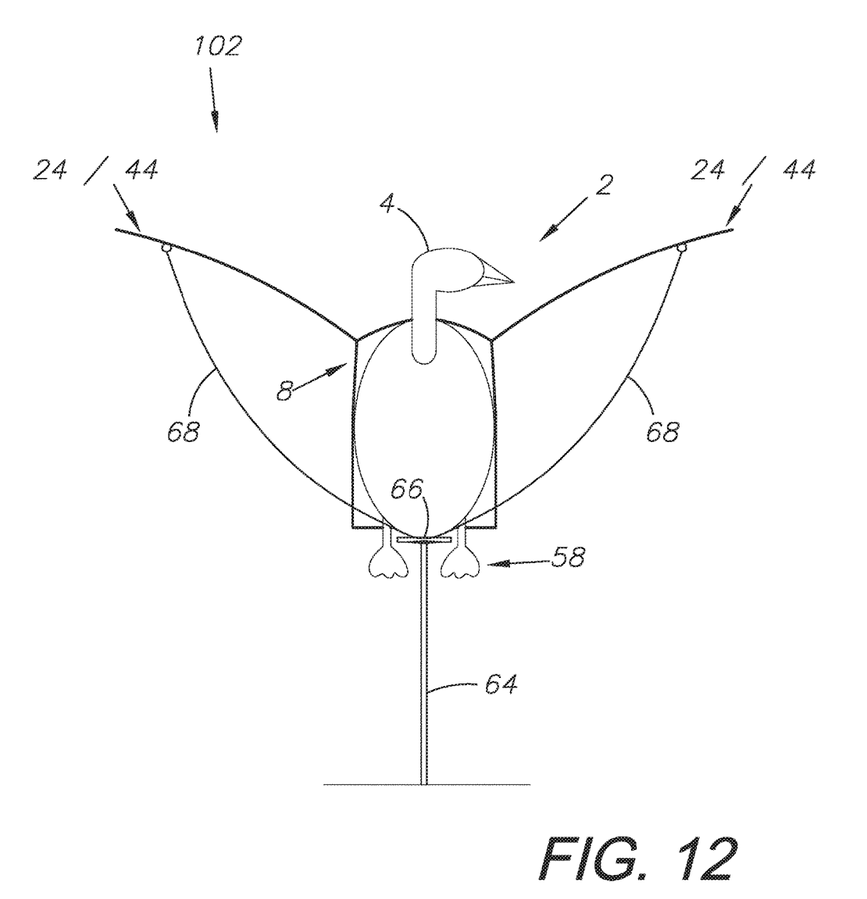
FIG. 12 is a diagrammatic front elevational view of an alternative embodiment of the present invention mounted on a pole structure.

FIG. 12 shows the hunting decoy harness system 2 as described above, but in this alternative embodiment system 102, the decoy 4 is raised into the air on top of a pole 64. A round washer 66 or other rotatable pedestal mount receives the base of the decoy and allows it to turn freely as wind blows the wings 22/24. The feet 58 also move in the breeze. Ties 68 connect to the loops 34 of the wings and prevent them from raising to far, such that they remain natural and appear to be flapping in the wind.

A hole could be drilled through the body of the decoy 4 such that the top of the pole 64 pokes through the decoy 4 and is received by the tab 28. A pin could be used to secure the pole 64 end into the tab 28, and the decoy can rotate about the pole. Alternatively, if the user didn't want to drill a hole through the decoy, a bungee cord could be wrapped about the body of the decoy 4 about the two front plates and that could be fastened to the pole. Alternatively, another pair of wire legs could wrap about the body of the decoy 4, where one end of each leg is welded to a respective front plate 14, and the other end of each leg are connected beneath the decoy 4 about the pole.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A hunting decoy harness system comprising:
   a hunting decoy having a body with a top face, two side faces, and a bottom face;
   said hunting decoy including a pair of legs affixed to said bottom face;
   a wire-framed harness including an arced front support configured for seating on said top face of said hunting decoy and a pair of side members configured to engage said two side faces of said hunting decoy, each of said pair of side members bent to lock about said bottom face of said hunting decoy;
   said wire-framed harness including two sets of receivers;
   a pair of wire-framed wings, each terminating into a pair of end tips configured to be inserted into a respective set of said receivers; and
   a pair of wing sleeves, each configured to be placed over one of said pair of wire-framed wings, and each of said pair of wing sleeves including a flap which wraps about a portion of said wire-framed harness;
   wherein each one of said side members is further bent to lock behind a respective one of said pair of legs.

2. The system of claim 1, further comprising:
   a pole placed beneath a ground plane and said hunting decoy, whereby said hunting decoy is mounted onto said pole; and
   a rotatable disk interfacing with said hunting decoy and said pole, such that said hunting decoy is capable of being rotated on a horizontal plane about a top end of said pole.

3. The system of claim 2, further comprising:
   a hole drilled through said hunting decoy;

said pole configured to pass through said hole; and
an end tip of said pole configured to be received within a tab located along said arced front support.

4. The system of claim 1, wherein said wing sleeves are screen printed to resemble a bird's wings.

5. The system of claim 1, further comprising:
each one of said pair of wing sleeves having a first connector element;
each one of said pair of wing sleeve flaps having a second connector element; and
whereby said first connector element and said second connector element are configured to interlock, securing said flap about a portion of said wire-framed harness.

6. The system of claim 5, wherein said first connector element and said second connector element are comprised of hook and loop fasteners.

7. A hunting decoy harness system comprising:
a hunting decoy having a body with a top face, two side faces, and a bottom face;
a wire-framed harness including an arced front support configured for seating on said top face of said hunting decoy and a pair of side members configured to engage said two side faces of said hunting decoy, each of said pair of side members bent to lock about said bottom face of said hunting decoy;
said wire-framed harness including two sets of receivers;
a pair of wire-framed wings, each terminating into a pair of end tips configured to be inserted into a respective set of said receivers;
a pair of wing sleeves, each configured to be placed over one of said pair of wire-framed wings, and each of said pair of wing sleeves including a flap which wraps about a portion of said wire-framed harness;
a tie having a first end and a second end;
each side wire-framed including a loop for receiving said first end of said tie; and
said second end of said tie configured to be affixed to a stationary body of the decoy, thereby preventing said wire-frames sings from raising above a fixed angle based upon a length of said tie.

8. The system of claim 7, further comprising:
said hunting decoy suspended above a ground plane on a pole.

9. A method of setting up a hunting decoy, the method comprising the steps:
placing a wire-framed harness about a body of the hunting decoy, said hunting decoy having the body with a top face, two side faces, and a bottom face and said wire-framed harness including an arced front support configured for seating on said top face of said hunting decoy and a pair of side members configured to engage said two side faces of said hunting decoy;
bending said pair of side members to lock about said bottom face of said hunting decoy;
connecting a pair of wire-framed wings to said wire-framed harness, wherein said wire-framed wings each terminate into a pair of end tips configured to be inserted into a respective set of receivers affixed to said wire-framed harness;
placing a respective one of a pair of wing sleeves onto a respective one of said pair of wire-framed wings, each of said pair of wing sleeves including a flap;
wrapping each flap about a portion of said wire-framed harness; and
bending said pair of side members to lock behind a respective one of a pair of legs affixed to said bottom face of said hunting decoy.

10. The method of claim 9, further comprising the steps:
mounting said hunting decoy upon a pole; and
interfacing said hunting decoy with a disk affixed to said pole such that said hunting decoy is capable of being rotated on a horizontal plane about a top end of said pole.

11. The method of claim 10, wherein:
said pole includes a bend in proximity to a first end of said pole;
said first end of said pole inserted into a fixed location; and
wherein said pole is configured to rotate and pitch about said fixed location.

12. A method of setting up a hunting decoy, the method comprising the steps:
placing a wire-framed harness about a body of the hunting decoy, said hunting decoy having the body with a top face, two side faces, and a bottom face and said wire-framed harness including an arced front support configured for seating on said top face of said hunting decoy and a pair of side members configured to engage said two side faces of said hunting decoy;
bending said pair of side members to lock about said bottom face of said hunting decoy;
connecting a pair of wire-framed wings to said wire-framed harness, wherein said wire-framed wings each terminate into a pair of end tips configured to be inserted into a respective set of receivers affixed to said wire-framed harness;
placing a respective one of a pair of wing sleeves onto a respective one of said pair of wire-framed wings, each of said pair of wing sleeves including a flap;
wrapping each flap about a portion of said wire-framed harness; and
connecting a first end of a tie to a loop of a selected one of said wire-framed wings; and
connecting a second end of said tie to a stationary body of the decoy, thereby preventing said selected one wire-framed wing from raising above a fixed angle based upon a length of said tie.

13. The system of claim 12, wherein said hunting decoy is suspended above a ground plane on a pole.

* * * * *